United States Patent Office 3,180,753
Patented Apr. 27, 1965

3,180,753
METHOD FOR FINISHING WOOD
William G. Fritsch, Chicago, and Arthur F. Bohnert, Park Ridge, Ill., assignors to Enterprise Paint Manufacturing Company, a corporation of Illinois
No Drawing. Filed Oct. 29, 1962, Ser. No. 233,951
3 Claims. (Cl. 117—45)

This invention relates to a method for finishing wood and more particularly for finishing gymnasium floors having markings thereon for defining game boundaries. After a gymnasium floor has been in use for some time it becomes worn as dirt and grime become ground into the surface coating. The boundary lines wear off. Basketball courts in particular must be refinished frequently to keep them in top condition, and preferably before the varnish coating becomes worn off.

Heretofore it has been customary to remove all of the varnish, including the boundary markings and lines, down to the wood by sanding or by using a conventional flammable varnish remover or one of the chlorinated hydrocarbon type. The chlorinated hydrocarbon types are preferred due to their nonflammability. The floor is then sealed, relined with marking enamels, and varnish is applied over the entire floor, including the markings. In those cases where the floor has not been refinished early enough and the wood has become abraded or scarred, it is necessary to sand the wood to a sufficient depth to provide a smooth surface for application of the varnish surface coating. Standard maple floors can be sanded only a few times before the wood is worn down to the nails, and then of course the floor must be replaced. Any of these procedures is laborious and costly because the new markings must be accurately applied and because the floors are of such large area.

It is the object of this invention to provide a method for finishing gymnasium floors and the like which completely eliminates the necessity for removing the boundary markings and/or sanding the wood.

This objective is accomplished by applying over the lined floor an initial protective coating consisting of a solvent resistant polyurethane coating. Preferably the floor is newly sanded and sealed and the lines are deposited from a polyurethane coating containing suitable pigment. Secondly, after the urethane coating has dried, a conventional varnish containing alkyd, phenol-formaldehyde, urea-formaldenyde, epoxy, or similar synthetic resins or natural resins, is applied over the entire surface. Preferably, multiple coats of the second composition are applied to provide a protective film of .002 to .005 inch. The number of coats required to provide this film thickness depends, of course, upon the viscosity and solids content of the varnish.

When a floor prepared in this manner is in need of refinishing, the varnish coating may be preferentially removed, leaving the polyurethane coating intact including the boundary markings.

The invention makes use of the fact that the operable polyurethane resin cured coatings are resistant to the solvent action of conventional paint and varnish removers, while the alkyd, phenol-formaldehyde, epoxy or other synthetic or natural resin varnishes are effectively lifted by such removers.

As used in this specification and in the appended claims, the term "polyurethane coatings" designates a solvent solution of a curable polyurethane resin which dries and cures to a hard insoluble film at room temperature. The solution contains from 25 to 70% resin solids by weight.

The polyurethane resins suitable for use in the coatings of this invention may be of the moisture-cured type or of the two component type, the latter being cured after the components have been mixed together, preferably in the presence of a catalyst. The moisture-cured type of resins are exemplified by polymers prepared from a diisocyanate having terminal —N=C=O groups and a hydrocarbon having reactive —OH groups. Suitable diisocyanates are exemplified by 2,4 tolylene diisocyanate, 2,6 tolylene diisosyanate, diphenylmethane 4,4' diisocyanate, like poly-functional isocyanates, and mixtures thereof. Suitable —OH bearing compounds are exemplified by short chain diols and triols, polyether diols and triols, raw castor oil and derivatives, said polyols having an average molecular weight ranging from 25 to 2000 and preferably between 400 and 800. Above a molecular weight of 2000 the polyols form resins that are not sufficiently hard and solvent resistant when cured. The isocyanate and the polyol are combined in such proportions that no free —OH groups are available for reaction, i.e., an excess of terminal —NCO groups are provided for reaction with moisture. The ratio of —NCO/OH (based upon the equivalent weights of the reactants) should be equal to about 1.5 to 3. Below 1.5 the resins are not stable and may gel prior to use in the container.

These resins utilize moisture in the atmosphere to cross link and cure, the water forming a urea bridge between the two —N=C=O groups to form the polyurea resin. A catalyst such as organic tin compounds and tertiary amines speed up the cure but reduce the stability of the moisture cured resins.

The two component resins are prepared from a diisocyanate polyol intermediate or a prepolymer having free terminal —N=C=O groups and a polyol having terminal —OH groups, such as polyesters, polyether glycols or triols, castor oil or derivatives, polyurethanes containing terminal —OH groups, and polyols containing tertiary amine nitrogen. The ratio of NCO/OH in the two component mixture ranges from 1.1 to 1.3. Such two component resins preferably are cured in the presence of an amine catalyst such as methyl diethanolamine or other tertiary amines.

The properties of the final polyurethane coating of either the two component or moisture-cured types are determined largely by the hydroxyl number of the hydroxyl bearing constituent. Low —OH numbers produce soft rubbery coatings, whereas high —OH numbers produce hard, brittle, solvent resistant coatings. For purposes of this invention, hard, tough solvent, resistant films are desired and the —OH number should be greater than 150 and less than 400.

EXAMPLE I

A gymnasium floor was finished as follows: The floor was freshly sanded and a coat of sealer applied. The preferred sealing composition is a moisture-curable polyurethane coating having the following composition.

*Composition A*

| | Mols |
|---|---|
| Tolylene diisocyanate | 8.1 |
| Trimethylol propane | 2 |
| 1,3 Butylene glycol | 1 |
| Polyether alcohol (molecular weight 1000) | 1 |

These compounds were mixed together and dissolved in a solvent comprising xylene and Cellosolve acetate to provide a solids content of 30%.

After application, the sealer was permitted to dry overnight and the coated floor was then rubbed with steel wool, swept, and tack ragged.

The boundary lines were then laid out and painted over the sealed floor, using the moisture-curing polyurethane liquid coating set forth above as Composition A, to which 2½ pounds of titanium dioxide were added to provide a white enamel. Red and black lines were also applied to the floor—using enamels with 1 pound of Guyandot red toner and ¼ pound carbon black respectively, as the pigment in the polyurethane coating. Again the floor was permitted to dry overnight. Two coats of polyurethane coating Composition A having a solids content of 40% were then applied over the entire floor, using a lamb's wool applicator. Approximately 16 hours elapsed between the first and second coats to permit drying. The moisture in the air resulted in the cross linking or curing of the resin in the coating. The cured resin was tough, hard and solvent resistant.

The final step in treating the floor consisted of applying surface coats of conventional varnish containing 42% epoxy resin, 20% resin, and 38% linseed fatty acids dissolved in a mixture of aliphatic and aromatic hydrocarbons with a small percentage of cobalt naphthenate drier.

When the surface became discolored and worn the surface coats of conventional varnish were removed, using a commercial varnish remover containing 70% methylene chloride, 15% methyl alcohol, 15% other solvents, and a small quantity of ethyl cellulose. Other commercial removers are suitable. This remover composition attacked the epoxy resin varnish and caused it to lift from the polyurethane coating beneath. The hard, tough polyurethane coating, however, was not removed because of its resistance to the solvent effect of the varnish remover. Thus the sealer, the boundary lines and the continuous film overlying these layers remained intact. After scraping off the softened varnish the floor was again smoothed with steel wool or similar pads and new coats of varnish were applied. After refinishing in this manner the floor recovered its original "new" appearance. The refinishing can be carried out as frequently as necessary without any need for sanding or removing the boundary lines.

Although a polyurethane coating is preferred for sealing the floor as well as for application of subsequent coats, other conventional sealers which hold down the fibers of the wood may be used. Furthermore, the composition of the surface coating of conventional varnish is not critical and may be of the alkyd, phenol-formaldehyde or other types. For example, an alkyd varnish may have the following composition:

|  | Percent |
|---|---|
| Phthalic anhydride | 19 |
| Pentarythritol | 18 |
| Dehydrated castor oil | 11 |
| Tall oil | 52 |

This is applied at from 25 to 50% solids content in mineral spirits with a small percentage of lead, cobalt and manganese naphthenate drier.

A phenol-formaldehyde varnish may have the following composition:

|  | Percent |
|---|---|
| Modified phenolic resin | 35 |
| Tung oil | 65 |

This may be applied at from 25 to 50% solids content in mineral spirits with a suitable metal naphthenate drier.

EXAMPLE II

The procedure described in Example I was repeated but instead of using a moisture-cured resin as the polyurethane coating, a two-component polyurethane resin was used. The first component consists of the following intermediate:

|  | Mols |
|---|---|
| Trimethylol propane | 1 |
| Tolylene diisocyanate | 3 |

This intermediate provides free —NCO groups and has an NCO/OH ratio of about 2. The second component consists of 0.8 mol of raw castor oil having an hydroxyl number equal to 163. In this specification the hydroxyl number is the number of milligrams of potassium hydroxide required to neutralize the acetic acid capable of combining by acetylation with 1 gram of sample. The two components were mixed together just prior to use in the proportions indicated to provide a mixture having an NCO/OH ratio of 1.2 to 1.3. To accelerate drying time 2% of methyl diethanolamine was added to the mixture. The mixture was then dissolved in a solvent consisting of xylene and Cellosolve acetate to 40% solids. Upon evaporation of the solvent, this resin cross linked to form a hard solvent-resistant film.

Other second component hydroxy compounds which may be admixed with the first compound intermediate to provide a satisfactory two-component resin include polyether triol (molecular weight 440, hydroxyl No.=410), and a prepolymer consisting of 12 mols of trimethylolpropane, 7.5 mols of adipic acid, and 1.5 mols of phthalic anhydride (hydroxyl No.=376–380).

Other modifications of the compositions will occur to those skilled in the art. It is our intention not to limit the invention to specific compositions other than those recited in the appended claims.

We claim:
1. A method for finishing a wooden gymnasium floor carrying boundary-defining markings which comprises sealing the wooden floor, applying as line markings to selected portions of the floor a polyurethane coating containing pigment of a color contrasting with said wooden floor, drying said coating, applying over the entire floor including said line markings multiple coats of a polyurethane coating resistant to the action of organic-solvent varnish removers and having an —NCO/OH ratio of at least 1.5, drying and curing individually said polyurethane coats, applying over said cured polyurethane coating a coat of a resin-oil varnish which is attacked by said varnish removers and subsequently removing the worn resin-oil varnish while leaving said cured polyurethane coating intact.

2. A method for finishing floors which comprises applying to the floor a polyurethane coating resistant to the action of chlorinated-hydrocarbon-type varnish removers, the polyurethane resin in said coating being moisture-cured and having an —NCO/OH ratio of at least 1.5 drying and curing said polyurethane coating, applying over said cured polyurethane coating a coating of a resin-oil varnish which is attacked by said varnish removers and subsequently removing the worn resin-oil varnish from said cured polyurethane coating therebeneath.

3. A method for finishing floors which comprises applying to the floor a polyurethane coating resistant to the action of chlorinated-hydrocarbon-type varnish removers, the polyurethane resin in said coating being taken from the group consisting of (a) a moisture-cured type in which the —NCO/OH ratio is in excess of 1.5 and (b) a two component amine-cured type in which the —NCO/OH ratio is between 1.1 and 1.3, drying and curing said polyurethane coating, applying over said cured polyurethane coating a coating of a resin-oil varnish which is attacked by said varnish removers and subsequently removing the worn resin-oil varnish from said cured polyurethane coating therebeneath.

References Cited by the Examiner
UNITED STATES PATENTS

| 2,292,468 | 8/42 | Oeffinger et al. | 117—72 |
| 2,901,467 | 8/59 | Croco | 117—148 |
| 3,012,987 | 12/61 | Ansul | 117—148 |
| 3,091,551 | 5/63 | Robertson | 117—148 |

OTHER REFERENCES

"Polyurethanes," Bernard A. Bombrow, Reinhold Publishing Corp., N.Y., 1957, pg. 140.

RICHARD D. NEVIUS, *Primary Examiner.*